Patented July 31, 1934

1,968,440

UNITED STATES PATENT OFFICE 1,968,440

LACQUER AND METHOD OF PREPARING THE SAME

Ernst Elbel and Fritz Seebach, Erkner, near Berlin, Germany, assignors to Bakelite Gesellschaft mit beschrankter Haftung, Berlin, Germany No Drawing. Application July 25, 1928, Serial No. 295,344. In Germany August 9, 1927

11 Claims. (Cl. 134—26)

The present invention relates to lacquers and methods of preparing the same and is particularly directed to lacquers prepared by the solution of B-type phenol-formaldehyde resins in suitable solvents.

It is well known that three types of hardenable phenol-formaldehyde artificial resins are recognized; the first in which the synthetic resin is fusible and easily soluble in the common solvents, for instance, alcohol (A type); the second in which the synthetic resins soften when heated, but are not fusible, yet swell in the usual solvents, but are not soluble therein (B type); the third, a form characterized by entire indifference towards heat or solvents (C type).

These terms as used in this specification and claims are intended to have the meaning defined by Baekeland, in Journal of Industrial and Engineering Chemistry, Vol. 4, (1912) at page 739.

The hardenable phenol-aldehyde synthetic resins (resoles, condition A) have been used as lacquers by dissolving them in alcohol, and these solutions, if desirable, with the addition of other solvents, such as amylacetate, are used as varnishes and lacquers.

The present method of producing lacquers and varnishes consists in dissolving B resins (resitole), which are insoluble in the common solvents for A type (resole) phenol-formaldehyde resins but only swell therein, in a solvent of the group comprising hydrogenated aromatic hydrocarbons, hydrogenated aromatic phenols and their esters, and cyclic ketones, such, for instance as cyclohexanone, cyclohexanol, hydrogenated naphthalene, and esters of cyclohexanol. These solutions used as lacquers, varnish coatings, show various advantages over the resoles employed heretofore.

The new varnishes, or lacquers, are distinguished by producing extraordinarily firm and resistant coatings. They require in their application no special variation of the common method of lacquering—a point of great technical importance. By heating under ordinary, or reduced, or increased, pressure to about 150°, the lacquer films can be transformed into the insoluble condition. It is not necessary at atmospheric pressure to slowly approach this temperature; but rather it is possible to start immediately with the proper hardening temperature. If heating is gradually conducted, it is possible to reach the hardening temperature more rapidly. The hardening temperature is optional, for instance, up to 230°. The lacquer coatings thus produced are of porcelain-like hardness and of a warm, for example, brown shade.

Suitable solvents for the solution of B-resins are cyclohexanone, cyclohexanol and its homologs, if desirable, in admixture with benzene hydrocarbons, benzines, chlorinated hydrocarbons, cyclohexanolacetate, the different hydrogenated phenols, phenol ester, also mixed with hexahydrobenzene, and if desirable, with additions of linseed oil, poppy-seed oil, wood oil, thick oil, "Standoel", etc.

*Example 1.*—Artificial resin preferably in the B-condition is comminuted and mixed with two parts by weight of cyclohexanone. It is advisable to stir. Solution takes place at ordinary temperatures. Solution can be facilitated by heating. Half of the solvent may be distilled off either in the vacuum or under normal pressure. The solvent can be diluted with alcohol, for instance two parts by weight.

*Example 2.*—75 parts by weight of B resin are treated with 75 parts by weight of cyclo-hexanol or a mixture of 70 parts by weight of dekahydronaphthalene and 70 parts by weight of cyclohexanol, as in Example 1.

*Example 3.*—In Example 2 cyclohexanol is substituted by methyl-cyclo-hexanol. One can use two parts by weight of methyl-cyclo-hexanol with one part by weight of benzol, or one part by weight of tetrahydronaphthalene, or benzine.

*Example 4.*—1 part by weight of B resin is treated with 2 parts by weight of cyclo-hexanol.

In all the examples mentioned above, the substance can be boiled for two hours under a reflux. If it is desired to distill off solvent, it may be done in the vacuum at temperatures up to 100° C. Boiling under reflux may be extended over 6 to 8 hours.

The use of larger quantities of solvents which are then distilled off offers the advantage that in the distillation volatile substances are also removed.

The lacquers can be thinned with diluents such as alcohol, benzol, oil of turpentine, solvent naphtha, and the like.

The lacquers during the process or thereafter may be mixed with catalyzers which assist the hardening. The mixing can be done to advantage immediately before use. Basic as well as acid catalyzers can be used, as for instance ammonia, organic bases, hexa-methylene tetramine, the substituted phenols, as well as the different nitro-phenols including picric acid, styphnic acid, picramid, trinitrophenetol, picramic acid, isopicramic acid, dinitro-cresol, trinitro-cresol, phenylamino-cresol. It is advisable to use 0.3 to 0.5% of these admixtures.

Heating, according to the examples mentioned, can also be done under 3 atmospheres pressure.

*Example 5.*—50 kilos B resin are heated in an autoclave with 100 kilos cyclohexanol for 2 to 5 hours at 230°. Mixtures of the different solvents can be employed and hydrogenated naphthalenes, substituted benzols, such as crude benzol, may be added.

The heating under pressure can also be done in the presence of fatty oils, such as linseed oil, wood oil. One may for example proceed as follows:

50 kilos B material, 100 kilos cyclohexanol, and 50 kilos "Standoel" are mixed, mutual solution taking place immediately. Then it is heated in the autoclave to 230 to 240° C., for 1 to 2 hours.

The final product is clear, difficultly fusible, and may be diluted with the usual lacquer diluents. The degree of polymerization of the product prepared in the autoclave is considerably affected by adding some paraform—1 to 3% figured on the resin.

A higher percentage of paraform causes gelation.

The product is more viscous and the air-dried coatings are more resistant to chemicals and soda-lye. Generally, the polymerization sets in easier with phenol resins than with cresol resins. B resins may also be obtained by heating 9 parts A resin with 1 part cyclohexanol for 3 to 4 hours to 100°. Very finely ground C resin can be added to A resin and the A resin thereafter transformed into B resin. By this procedure, lacquers are obtained containing very finely divided C resin which does not precipitate. Thus, coatings of great resistance are obtained.

These lacquer solutions can also be produced, using organic solvents which are not normally capable of dissolving B resin, if heated under pressure. For instance, B resin can be treated with alcohol or benzol under pressure by employing for instance 6 to 8 atmospheres pressure and reacting 1 part by weight B resin with 4 parts by weight of alcohol (96% alcohol) for a period of 3 hours up to 150° C.

The B resin is produced by heating A resin (German Patent 237,790) with or without pressure to temperatures above 100° or by heating mixtures of phenol or its homologs, and formaldehyde or its polymers, with or without condensing agents, until under atmospheric pressure the B resin, insoluble in alcohol or glycerine, is formed. Unhardenable resins (Novolaks) may also be mixed with further quantities of formaldehyde or its polymers, with or without condensing agents, for instance with hexamethylenetetramine, and then heated for some time.

As a solvent for the B resin, glycerine may be used either by itself or in mixture with alcohol or the other solvents.

It was known that resoles (A resins) dissolve in cyclohexanol, its homologs and esters (German Patents 349,905, 351,688). On the other hand, it is surprising that the resitoles (B resins), substances which do not dissolve in other solvents, this being their characteristic, are at all capable of dissolving in organic solvents.

The method of applying lacquers consists in brushing, or spraying, the lacquers onto the product to be lacquered, after admixing filling agents or dyestuffs, such as kieselguhr, graphite, ultramarine, soot, pitch, sand, bronze powder, red lead, ocher, resinates of the metals, allowing the solvent to evaporate at the room temperature, or increased temperature, if necessary conducting air or indifferent gases over it, or employing vacuum in a vacuum chamber. One may also carry out impregnations by evacuating the substance or article to be impregnated in the resin solution and then add the dissolved resin. Hereby pressure may be applied.

The lacquer may also be employed as binding agent and cement by applying the solutions to the materials to be combined or cemented and allowing the solvent to evaporate. The lacquer can, particularly by admixture of organic and inorganic filling substances, be used for the production of molding mixtures for the manufacture of grinding wheels and in all lines where a cementing material is required.

A hardening of the lacquer is not necessary but may be effected by further heating, if necessary, under pressure.

One may mix the lacquers with plasticizing agents, such as cellulose ester, chlorhydrines and the like. The quantity varies according to the degree to be obtained; for example, one may add 5% of chlorhydrine or acetyl-cellulose.

One may also compound the lacquers with fireproofing materials, such as ammonium carbonate, ammonium sulfate, magnesium chloride, magnesium sulfate, and mixtures thereof; for instance, 10 to 20% may be added.

In the following claims the term "B-type phenol-formaldehyde resins" is intended to comprise phenol-formaldehyde condensation products which are solid when cold, and soften when heated without melting, and which swell in acetone without dissolving.

We claim:

1. Process of making lacquers and varnishes containing hardenable phenol-formaldehyde resins which comprises reacting a phenol-formaldehyde resin to a resitole stage wherein the product is thermoplastic but infusible and which is insoluble in alcohol but swells therein, and then dissolving said resin in an organic solvent of the group consisting of hydrogenated aromatic hydrocarbons, hexahydrogenated phenols and their esters and hydroaromatic cyclic ketones.

2. Process as defined in claim 1 characterized in that the solvent comprises cyclohexanone.

3. Process as defined in claim 1 characterized in that the solvent comprises hydrogenated naphthalene.

4. As a composition of matter a solution of a phenol-formaldehyde resin in an organic solvent of the group consisting of hydrogenated aromatic hydrocarbons, hexahydrogenated phenols and their esters and hydroaromatic cyclic ketones, which composition is prepared by reacting a phenol-formaldehyde resin to a resitole stage at which it is thermoplastic but infusible and at which it is insoluble in alcohol but swells therein and then dissolving said resin in the organic solvent.

5. Composition of matter as defined in claim 4 characterized in that the solvent comprises cyclohexanone.

6. Composition of matter as defined in claim 4 characterized in that the solvent comprises hydrogenated naphthalene.

7. Process of making lacquers and varnishes containing hardenable phenol-formaldehyde resins which comprises dissolving in an organic solvent of the group consisting of hydrogenated aromatic hydrocarbons, hexahydrogenated phenols and their esters and hydroaromatic cyclic ketones a phenol-formaldehyde resin which has been reacted in the absence of solvent to a resitole stage at which it is thermoplastic but infusible and at which it is insoluble in alcohol but swells therein.

8. As a composition of matter a solution of a phenol-formaldehyde resin in an organic solvent of the group consisting of hydrogenated aromatic hydrocarbons, hexahydrogenated phenols and their esters and hydroaromatic cyclic ketones, which compostion is prepared by dissolving in said organic solvent a pre-formed phenol-formaldehyde resin which has been reacted to a stage at which it is thermoplastic but infusible and at which it is insoluble in alcohol but swells therein.

9. Process as defined in claim 1, characterized in that the resitole is heated with the solvent in the presence of a fatty oil.

10. As a composition of matter a solution in a solvent of the group consisting of hydrogenated aromatic hydrocarbons, hexahydrogenated phenols and their esters, and hydroaromatic cyclic ketones of a phenol-formaldehyde resin which is thermoplastic but infusible and which is insoluble in alcohol but swells therein.

11. Composition of matter defined in claim 10, characterized in that the solution contains a fatty oil.

ERNST ELBEL.
FRITZ SEEBACH.